United States Patent
Coman

(10) Patent No.: US 7,081,690 B2
(45) Date of Patent: Jul. 25, 2006

(54) FLOATING ELECTRICITY PRODUCTION UNIT

(76) Inventor: John H Coman, 1355 Sandtrap Dr., Fort Myers, FL (US) 33919

( * ) Notice: Subject to any disclaimer, the term of this patent is extended or adjusted under 35 U.S.C. 154(b) by 0 days.

(21) Appl. No.: 11/003,047

(22) Filed: Dec. 3, 2004

(65) Prior Publication Data

US 2006/0119107 A1   Jun. 8, 2006

(51) Int. Cl.
    *F03B 13/00* (2006.01)
(52) U.S. Cl. ............................................. 290/54
(58) Field of Classification Search ............... 290/54, 290/43; F03B 7/00
    See application file for complete search history.

(56) References Cited

U.S. PATENT DOCUMENTS

| | | | | |
|---|---|---|---|---|
| 244,221 | A | * | 7/1881 | Fountain et al. .............. 415/7 |
| 313,746 | A | * | 3/1885 | Man ............................. 290/43 |
| 328,447 | A | * | 10/1885 | Brady .......................... 290/43 |
| 447,915 | A | * | 3/1891 | Stephene ..................... 290/43 |
| 867,192 | A | * | 9/1907 | Dawson ....................... 290/43 |
| 4,301,377 | A | * | 11/1981 | Rydz ........................... 290/43 |
| 4,383,797 | A | * | 5/1983 | Lee .............................. 415/7 |
| 4,446,378 | A | * | 5/1984 | Martinez Parra ............ 290/54 |
| 4,516,033 | A | * | 5/1985 | Olson .......................... 290/54 |
| 4,598,210 | A | * | 7/1986 | Biscomb ...................... 290/43 |
| 4,717,831 | A | * | 1/1988 | Kikuchi ....................... 290/53 |
| 5,430,332 | A | * | 7/1995 | Dunn, Jr. ..................... 290/54 |
| 6,365,984 | B1 | * | 4/2002 | Shu ............................. 290/53 |
| 6,551,053 | B1 | * | 4/2003 | Schuetz ...................... 415/3.1 |
| 2005/0173927 | A1 | * | 8/2005 | Aukon ........................ 290/43 |

FOREIGN PATENT DOCUMENTS

| | | |
|---|---|---|
| DE | 38 00 192 | 8/1988 |
| DE | 40 26 638 | 2/1992 |
| DE | 198 50 948 | 5/2000 |
| DE | 101 59 019 | 6/2003 |
| EP | 0 758 052 | 2/1997 |
| FR | 1 176 703 | 4/1959 |
| FR | 2420668 A | * 11/1979 |
| GB | 165 339 | 6/1921 |
| GB | 1521631 A | * 8/1978 |
| GB | 2223063 A | * 3/1990 |
| NL | 8 500 252 | 8/1986 |

OTHER PUBLICATIONS

Written Opinion of the ISA.

* cited by examiner

*Primary Examiner*—Joseph Waks
(74) *Attorney, Agent, or Firm*—Hershkovitz & Associates; Abe Hershkovitz

(57) ABSTRACT

Electricity is produced by harvesting energy from flowing water, which does not harm the environment and which does not consume natural resources. A paddle wheel is stationarily positioned to penetrate the surface of a body of water. Preferably, a plurality of paddle wheels are deployed on a single floating platform to optimize the transfer of the energy contained in the flow of water passing the floating platform. Each paddle wheel is geared to rapidly rotate a generator axle of an electricity generator of the type conventionally deployed for wind turbines on "wind farms". Preferably, each paddle wheel powers a plurality of electricity generators. Structure is provided to compensate for variations in flow rates in the body of water to intensify a flow of the water and to vary a depth of penetration of the paddle wheel into the water.

21 Claims, 6 Drawing Sheets

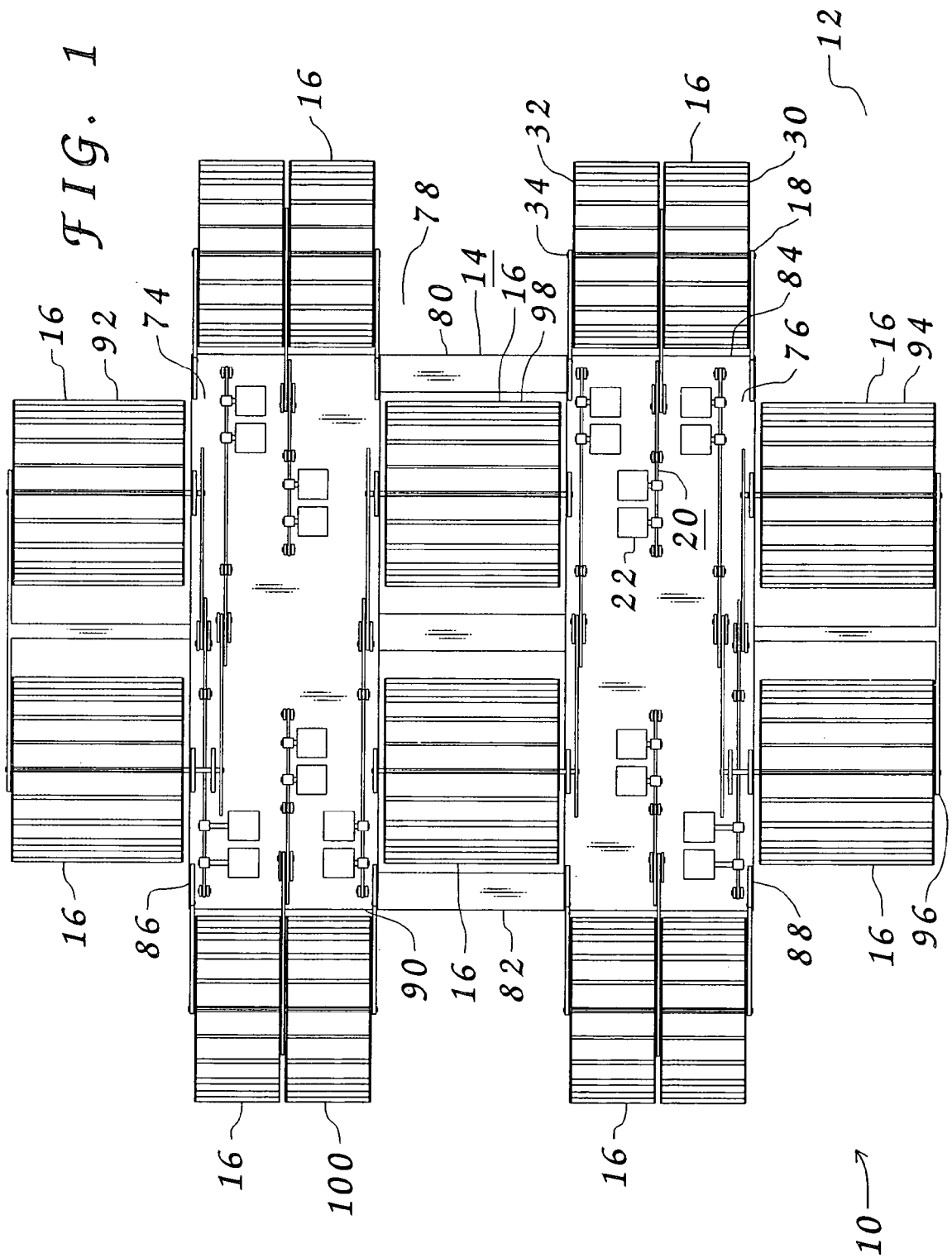

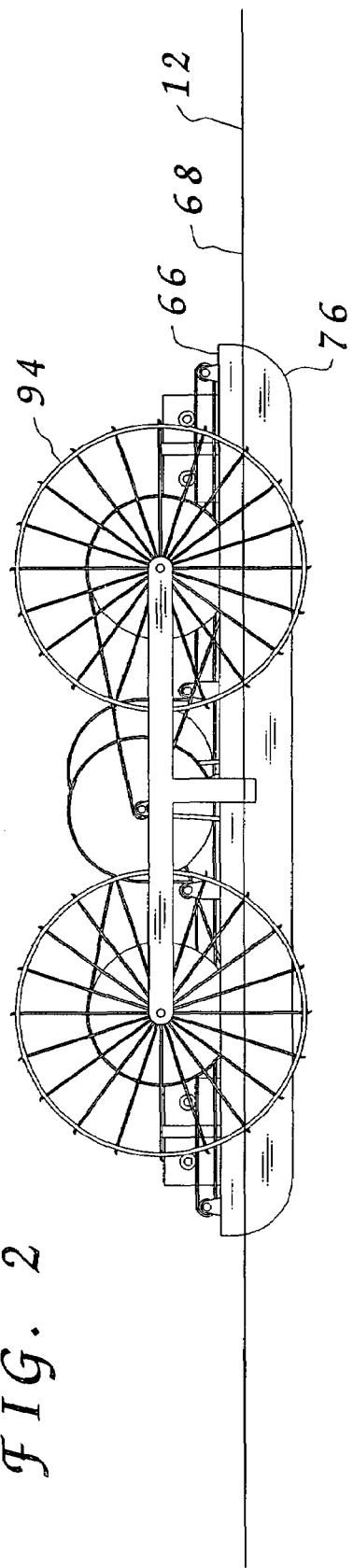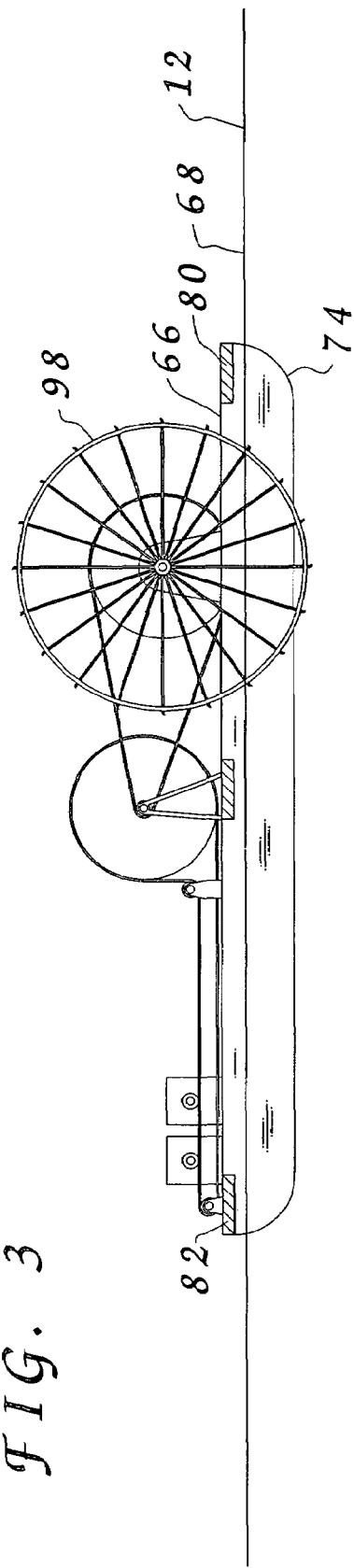

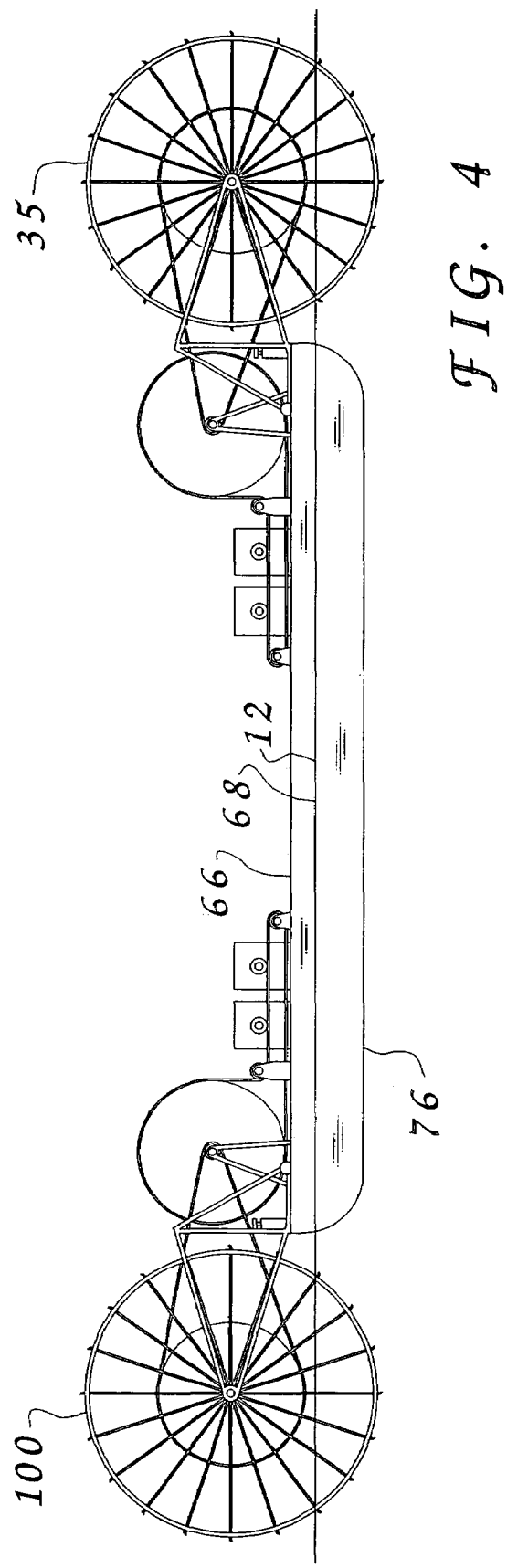
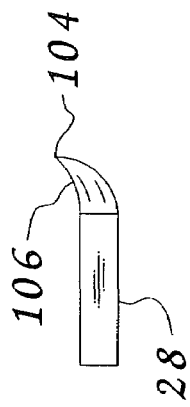

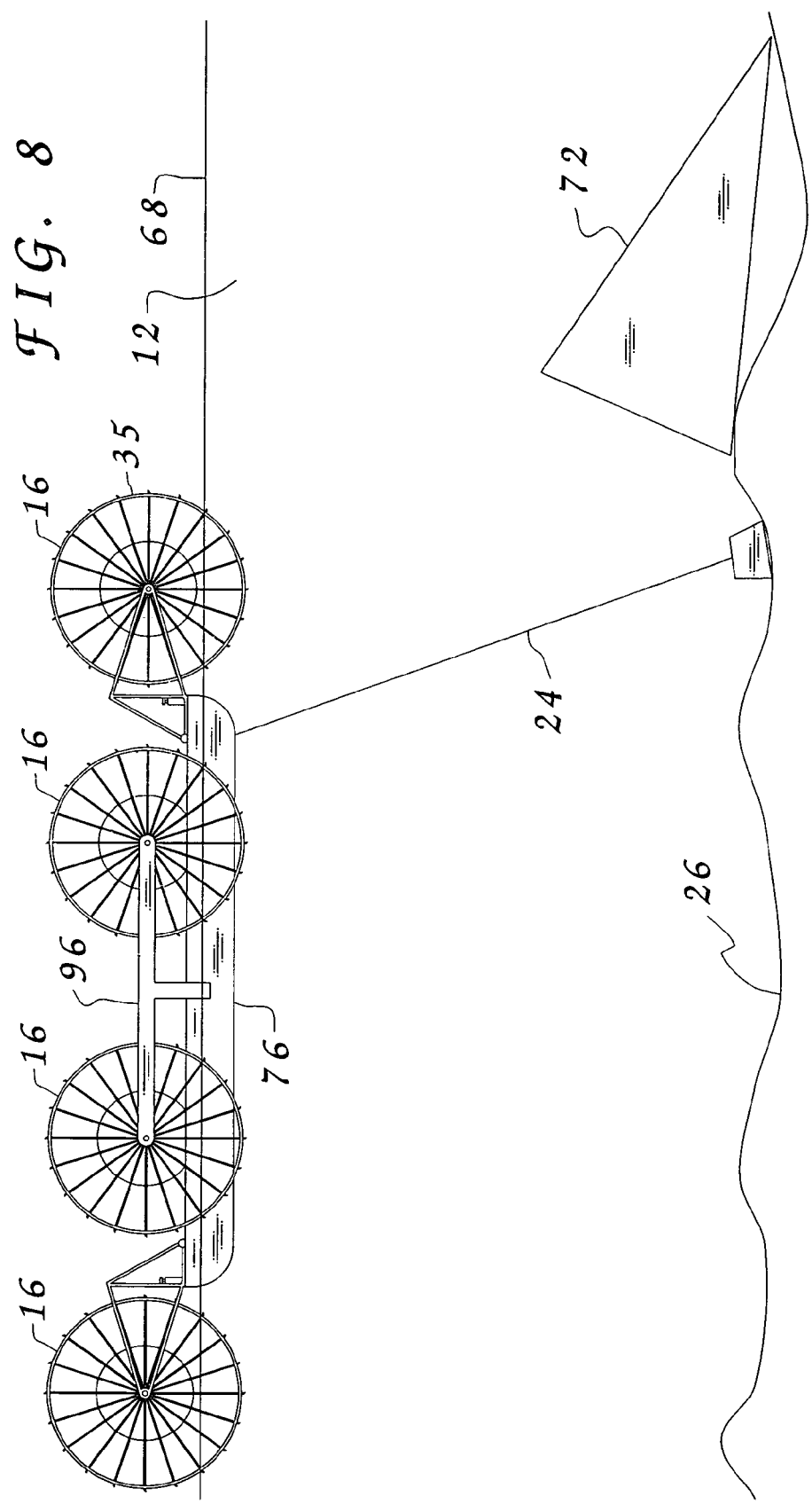

FLOATING ELECTRICITY PRODUCTION UNIT

BACKGROUND

1. Field of the Invention

Generally, the invention relates to devices which may produce electricity from naturally occurring environmental conditions. More specifically, the invention relates to such devices which may produce electricity utilizing the energy available in flowing bodies of water, such as rivers.

2. Description of the Prior Art

Numerous methods exist to produce electricity. A common method in commercial use involves burning a combustible material, such as oil, natural gas or coal, to directly power a generator unit or to heat a fluid to produce steam to power a generator unit. This method has the deficiencies that it consumes exhaustible resources and produces environmentally harmful byproducts. Another common method in commercial use involves using a radioactive material maintained at a precise nuclear reaction state to produce heat to heat a fluid to produce steam to power a generator unit. This method has many deficiencies including high initial construction costs for such facilities, the potential and actual environmental damage associated with accidents at such facilities and the long term storage problems associated with the spent "fuel rods" from such facilities. Yet another common method in commercial use involves harnessing the energy produced during movement of water from a first, elevationally high, position and a second, elevationally low, position as occurs in certain flowing bodies of water. Such elevational changes may be naturally occurring, such as where waterfalls exist, or may be man-made, such as where dams are constructed. Typically water is diverted from the head water to run through conduits under pressure from the water above to turn turbines prior to being discharged downstream. While this is an extremely efficient method of electricity production, various deficiencies exist. A finite quantity of water makes the elevational change at a given installation location and therefore limitations exist in the utilization of this energy. Additionally, the electricity production facility must be positioned in close proximity to the location where the elevational change occurs. When the elevational change is naturally occurring, installation must occur near the waterfalls. When the elevational change is man-made, installation must occur near the man-made dam. These locations may be far removed from consumption locations for the electricity produced. Still another method in limited commercial use involves "wind farms" where a plurality of windmills, each having a tower, a wind turnable blade and an electricity generator, are installed. Such wind farms have many desirable features but also have notable deficiencies. A major deficiency involves the lack of reliability in the velocity of wind. Another deficiency involves the space requirements for large scale installations. Other electricity production methods are known or have been envisioned, such a solar, ocean wave, ocean tidal and utilization of internal heat from the earth. None of these methods have been widely accepted for commercial electricity production. A common deficiency with each of the above mentioned commercial electricity production methods involves the requirement that the facility be installed in a fixed position. This eliminates convenient relocation of the production capability from one location to another location.

Various methods have been utilized or proposed to harness the energy in flowing water in rivers or streams for various useful purposes, including electricity production. Typically such methods have been insufficient to produce electricity in sufficient quantity to be practical.

Various deficiencies exist with each of the above mentioned methods of producing electricity. As can be seen, various attempts have been devised to produce electricity in an efficient and economical manner. These attempts have been less efficient than desired. As such, it may be appreciated that there continues to be a need for a method of producing electricity which does not harm the environment nor consume natural resources. The present invention substantially fulfills these needs.

SUMMARY

In view of the foregoing disadvantages inherent in the known types of electricity production, your applicant has devised a method of producing electricity from energy intrinsically contained within a flowing body of water. An electricity production unit converts a portion of the energy from the flowing body of water into electricity. The electricity production unit has a paddle wheel, mounting means, transfer means and an electricity generator. The paddle wheel is positionable partially into the flowing body of water. The paddle wheel has a plurality of paddles, opposing ends and a central axis about which the paddle wheel rotates. The paddles repetitively encounter the flowing body of water and move along with the flowing body of water while in contact with the flowing body of water. The mounting means provides for mounting the opposing ends of the paddle wheel for rotation of the paddle wheel about the central axis of the paddle wheel. The transfer means provides for transferring the motion from the rotation of the paddle wheel to the electricity generator. The electricity generator converts the motion of the rotation of the paddle wheel transferred by the transfer means into electricity.

My invention resides not in any one of these features per se, but rather in the particular combinations of them, herein disclosed, and it is distinguished from the prior art in these particular combinations of these structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore a primary object of the present invention to provide for production of electricity for use by mankind from the energy in flowing water existing in many rivers, canals, sluices and creeks.

Other objects include:

a) to provide for an extremely economical method of producing electricity.

b) to provide for a versatile electricity production platform which may be easily and economically transported from a manufacturing location, where the electricity production platform is fabricated, to an installation location, where electricity will be produced.

c) to provide for a versatile electricity production platform which may easily and economically be transported from an existing electricity production location to another electricity production location.

d) to provide for a versatile electricity production platform which may be quickly deployed to an electricity production location during times of natural disasters which interrupt conventional delivery of electricity at or near the electricity production location.

e) to provide for utilization of a renewable energy source, in the form of naturally flowing water, which is extremely consistent and reliable for the production of electricity.

f) to provide for an electricity production unit which floats on the surface of a flowing body of water in an anchored manner while harvesting the energy from the flow of water passing the electricity production unit.

g) to provide for use of a plurality of paddle wheels each powering a plurality of electricity generators on a single platform.

h) to provide for rotational conversion means to provide for each rotation of a paddle wheel to produce a multiplicity of rotations of a generator axle of an electricity generator.

i) to provide for selectively varying a depth of penetration of the paddle wheel relative to the surface of the body of water to compensate for variations in a flow of the water encountering the paddle wheel.

j) To provide for use of existing surplus electricity generators currently used on "wind farms" to produce electricity using the energy available in flowing bodies of water.

k) To provide means which are physically separate and independent of the floating platform to enhance the flow or velocity of water engaging the paddle wheel.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there is illustrated the preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein;

FIG. 1 is a top plan view of an electricity production unit positioned within a flowing body of water.

FIG. 2 is an elevational side view of select components of the electricity production unit depicted in FIG. 1.

FIG. 3 is an elevational side view of select components of the electricity production unit depicted in FIG. 1.

FIG. 4 is an elevational side view of select components of the electricity production unit depicted in FIG. 1.

FIG. 5 is an enlarged elevational side view of a paddle.

FIG. 8 is an elevational side view of select components of the electricity production unit depicted in FIG. 1 positioned in the flowing body of water including a bed of the body of water.

DESCRIPTION

Figure 6:
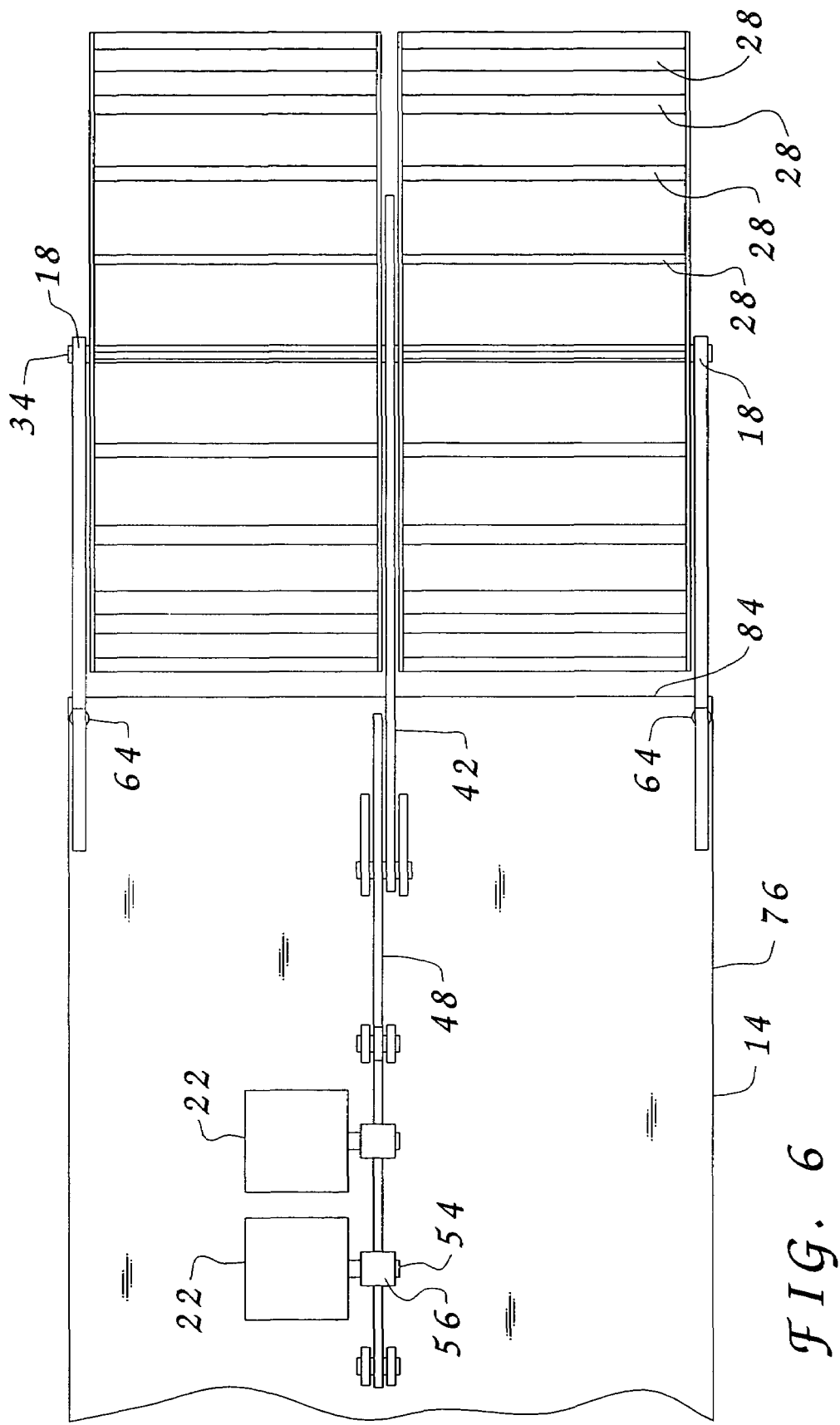
FIG. 6 is a top plan view of a portion of the electricity production unit depicted in FIG. 1.

Many different electricity production units having features of the present invention are possible. The following description describes the preferred embodiment of select features of those units and various combinations thereof. These features may be deployed in various combinations to arrive at various desirable working configurations of electricity production units.

Reference is hereafter made to the drawings where like reference numerals refer to like parts throughout the various views.

An electricity production unit will have a paddle wheel, means to mount the paddle wheel, means to transfer motion of rotation of the paddle wheel and an electricity generator capable of conversion of the motion of rotation of the paddle wheel into electricity. The electricity production unit is capable of conversion of kinetic energy from a flowing body of water into electricity.

Various positioning means may be utilized to position the electricity production unit relative to the body of water. The electricity production unit may be stationarily mounted relative to dry land or the bed of the flowing body of water. Such positioning will provide for the paddle wheel to be partially positioned into the flowing body of water. More preferably, the electricity production unit will be mounted on a floating platform which is stationarily anchored within the flowing body of water by any of the conventional methods known in the art to secure floating platforms in bodies of water.

Preferably, the platform will have multiple paddle wheels mounted thereon. It is possible to mount a paddle wheel, or wheels, on a leading edge of the platform generally facing into the flow of water and mount a paddle wheel, or wheels, on each of the opposing side edges of the platform. Additionally, if the design of the platform does not interfere in a significant way with the flow of water beneath the platform, a paddle wheel, or wheels, may be mounted on a trailing edge of the platform opposing the leading edge. It is possible to provide for a passageway, or passageways, through the platform which has a free flow of water there through. Into this passageway a paddle wheel, or wheels, may be mounted to encounter the water flowing through the passageway. A simple method of providing this passageway involves providing opposing barges mounted together with the passageway there between. Means may be provided in the configuration of the surfaces of the floating platform adjacent the passageway to enhance or accelerate the flow of water through the passageway.

It is preferred to utilize the floating platform deployment option in order to provide various benefits. One advantage of the floating platform configuration involves centralized manufacture of units to occur at a location distinct from the intended installation locations. Once transported to the intended installation location, the floating platform is secured in place relative to the body of water and power transfer lines are attached to transfer the produced electricity. The floating platform may have various supporting equipment mounted thereon, such as measuring meter, transformers and rectifiers. Of course, any or all such supporting equipment may be positioned on other structures or on dry land.

In any of the embodiments of the present invention the produced electricity may be consumed at the installation location or transferred to more distant locations, including being transferred into an existing power grid. Due to the relative stability in the flow within flowing bodies of water, and the capabilities to adjust characteristics associated with electricity output to compensate for variations in flow rates, electricity production units having features of the present invention are ideally suited to produce consistent, reliable and inexpensive electricity.

The paddle wheel will have a plurality of paddles positioned thereon in a generally radial arrangement. Each paddle will intermittently enter the flowing body of water and, biased by the energy present in the flow of water, will move along with the flow of water, as is well known in the art. The paddle wheel will continuously rotate about a central axis as a result of the intermittent penetration and movement with the flow of water by the totality of paddles. While the paddle wheel may have a generally cylindrical appearance, with generally straight periphery edges of the paddles, it is possible to have any desired configuration. One example of this involves a curvature along the periphery edges of the paddles. Another example of this involves an angular offset of the periphery edges of the paddles relative to the central axis of the paddle wheel.

Specifically deployed paddle wheels may have an extremely wide range of radial diameters and an extremely wide range of lateral lengths. Each paddle attached to the paddle wheel preferably will have a length generally equaling the lateral length of the overall paddle wheel upon which it is mounted but may be longer or shorter if desired. Each paddle will have a width, measured from an outer extent, periphery edge, generally toward the central axis of the paddle wheel, sufficient to provide an expansive contact surface for the water to act upon. While each paddle may be flat if desired, preferably there will exist a curvature at least in close proximity to the outer extent to enhance water trapping capabilities of the paddle. The paddles may be constructed of any suitable material having properties allowing durable repetitive pressure bearing contact with water.

Transfer means will exist to transfer the rotation of the paddle wheel from the paddle wheel to an electricity generator. Many methods are known in the art to transfer rotational movement from a first member to rotational movement of a second member and many of these methods may be utilized with the present invention. In a preferred embodiment of the present invention a conversion will be provided for where the rotational speed of the paddle wheel is mechanically converted into a much higher rotational speed of an input member of the generator. Many methods are known in the art to provide this desired conversion and many of these methods may be used with the present invention.

The transfer of rotational power may take place from various positions about the paddle wheel including at an axle at least partially supporting the paddle wheel or from an extending member having a large diametric measurement and rotating with the central axis of the paddle wheel. This latter example provides for an initial conversion of rotational speed when coupled with a member having a much smaller diametric measurement. In a preferred embodiment at least two (2) such conversions occur to radially increase the revolutions per minute (RPM) rate of the input shaft of the generator compared to the RPM rate of the paddle wheel.

The transfer of rotational power may occur at any desired location relative to the paddle wheel. These locations include spaced from either end of the paddles of the paddle wheel or near the ends of the paddles of the paddle wheel. It is possible to provide for opposing sets of paddles on a paddle wheel with a transfer placement location there between. It is possible to have a single output point from a paddle wheel or provide for two (2) or more output points, such as from opposing ends of the paddle wheel. When multiple output points are positioned on a respective paddle wheel the power transferred may be delivered to a single generator, or set of generators, or may be independently delivered to multiple generators, or sets of generators.

While more complicated transfer arrangements are envisioned, and may be utilized, it is possible to utilize a direct chain drive arrangement to transfer power from the paddle wheel to the generator. Such an arrangement has many advantages including those related to manufacture, maintenance and operation.

An electricity generator will exist to provide for conversion of the energy contained in the rotation of the paddle wheel into electricity. Any of the numerous designs of generators may be used with the present invention with a particularly expedient choice being the class of generators currently being deployed on commercial and experimental 'wind farms' for use with windmills. Various manufacturers and models exist for such generators in use on 'wind farms'. Preferably, universal mounting means will be provided for placement of various existing production electricity generators relative to the paddle wheel.

In a preferred embodiment of the present invention multiple generators will be powered by a single paddle wheel. A particularly desirable feature of having multiple generators being driven by a single paddle wheel involves ease of maintenance. A mechanical arrangement may be provided where a select generator may be disengaged from the series and reengaged with the series without interfering with the continuous operation of the paddle wheel or the remaining generator, or generators. This arrangement affords continuous operation of the electricity production unit with minor variations in power output.

Means may be provided to enhance the flow or velocity of the water engaging the paddle wheel. Many methods may be utilized to provide this feature. Physical elements, either permanently or temporarily, may be positioned to restrict and guide at least a portion of the water flow toward the paddle wheel. Such an element may be positioned to extend up from the bed of the body of water or may be positioned to extend outward from either bank of the body of water or may be positioned at or near the surface of the body of water. If desired, means may be provided to mechanically adjust a rate of diversion depending upon specific operating conditions.

A series of paddle wheels may be aligned in a row, such as along either side of the platform or within the passageway. In these occasions it is possible to provide for the subsequent paddle wheels to have features, such as a deeper penetration of the body of water and/or a greater diameter and/or longer paddles, to compensate for a diminished velocity of the flow of water encountered by the trailing paddle wheels due to the prior encounter of the flow of water with the forward paddle wheel.

Means may be provided to vary a quantity of power taken by the paddle wheel from the flow of water. Various methods are known in certain arts to provide such selective variation and many of these may be employed with the present invention. An example would involve selectively varying an angle of attack of the paddles, or a select portion of the individual paddles, or a select group of paddles, relative to the central axis of the paddle wheel. Another example would involve selectively varying a spacing distance of the paddles, or select paddles, relative to the central axis of the paddle wheel. Still another example involves selectively varying a depth of penetration of the paddle wheel relative to a surface of the body of water to place a greater or lesser surface area of the paddles into contact with the water. This varying of the depth of penetration may involve either elevationally displacing the paddle wheel relative to the mounting surface of the paddle wheel or elevationally displacing the entire platform housing the paddle wheel relative to the surface of the body of water. When a floating platform is employed to house the electricity production unit, a fluid storage tank, or tanks, may be positioned thereon with transfer of water there into or there out of to selectively vary a buoyancy of the floating platform. Means may be deployed to measure the torque produced by the paddle wheel with associated means to adjust the torque to a desired measurement.

An electricity production unit 10, depicted in various of the views, provides for a conversion of energy from a flowing body of water 12 into electricity. Electricity production unit 10 has a floating platform 14, a plurality of paddle wheels 16, mounting means in the form of axle blocks 18, transfer means in the form of chain drive assemblies 20 and a plurality of electricity generators 22. Floating platform 14 is secured at a desired location within flowing body of water 12 utilizing positioning means such as an anchor line 24 which is secured to bed 26 of flowing body of water 12.

Each paddle wheel 16 is partially positionable into the flowing body of water. Each paddle wheel 16 has a plurality of paddles 28 which repetitively encounter flowing body of water 12 and move along with flowing body of water 12 while in contact with flowing body of water 12 to cause the respective paddle wheel 16 to rotate. Each paddle wheel 16 has opposing ends 30 and 32 which rotatably engage a respective axle block 18. Each paddle wheel 16 has a central axis 34 about which the respective paddle wheel 16 rotates in response to encountering the energy in flowing body of water 12. The following descriptions make specific reference to a leading end paddle wheel 35, specifically see FIG. 6 and FIG. 7, and these references are applicable to any of the deployed paddle wheels 16.

Chain drive assembly 20 provides for a mechanical coupling for transfer to a plurality of electricity generators 22 of the rotational power created by the turning of leading end paddle wheel 35. Each chain drive assembly 20 may utilize any suitable components as conventionally known in the art. A first gear 36 is fixedly mounted relative to central axis 34 of leading end paddle wheel 35. A second gear 38 is mounted to an intermediate idler assembly 40 and a first drive chain 42 rotates about first gear 36 and second gear 38 to transfer the rotational power from leading end paddle wheel 35 to an axle 44 of intermediate idler assembly 40. Chain drive assembly 20 also provides for transfer of the rotation power transferred to second gear 38 through axle 44 to a third gear 46 attached to axle 44 of intermediate idler assembly 40. A second drive chain 48 rotates about third gear 46, a fourth gear 50 and an idler gear 52. Idler gear 52 provide for a directional change in the path of second drive chain 48. Each electricity generator 22 has a generator axle 54 having a generator gear 56 attached thereto. Generator gear 56 of the respective electricity generator 22 engages second drive chain 48 to transfer the rotational power to the respective electricity generator 22. Each electricity generator 22 is capable of a conversion of the motion of the rotation of leading end paddle wheel 35 transferred by the transfer means into electricity. Leading end paddle wheel 35 transfers power to a plurality of electricity generators 22.

First gear 36 has a larger diametric measurement then the diametric measurement of second gear 38 which provides for an increase in the revolutions per minute (RPM) rate of second gear 38 relative to first gear 36. Second gear 38 and third gear 46 are each fixedly attached to axle 44 of intermediate idler assembly 40 and therefore have the same RPM rate. Third gear 46 has a larger diametric measurement then the diametric measurement of generator gears 56 which provides for an increase in the RPM rate of generator gears 56 relative to third gear 46. Each chain drive assembly 20 provides for a first rotational conversion means and a second rotational conversion means to radically increase in the RPM rate of generator axle 54 of electricity generator 22 relative to the RPM rate of the paddle wheel. These conversions provide for each rotation of leading end paddle wheel 35 to produce a multiplicity of rotations of generator axle 54 of electricity generator 22.

Figure 7:
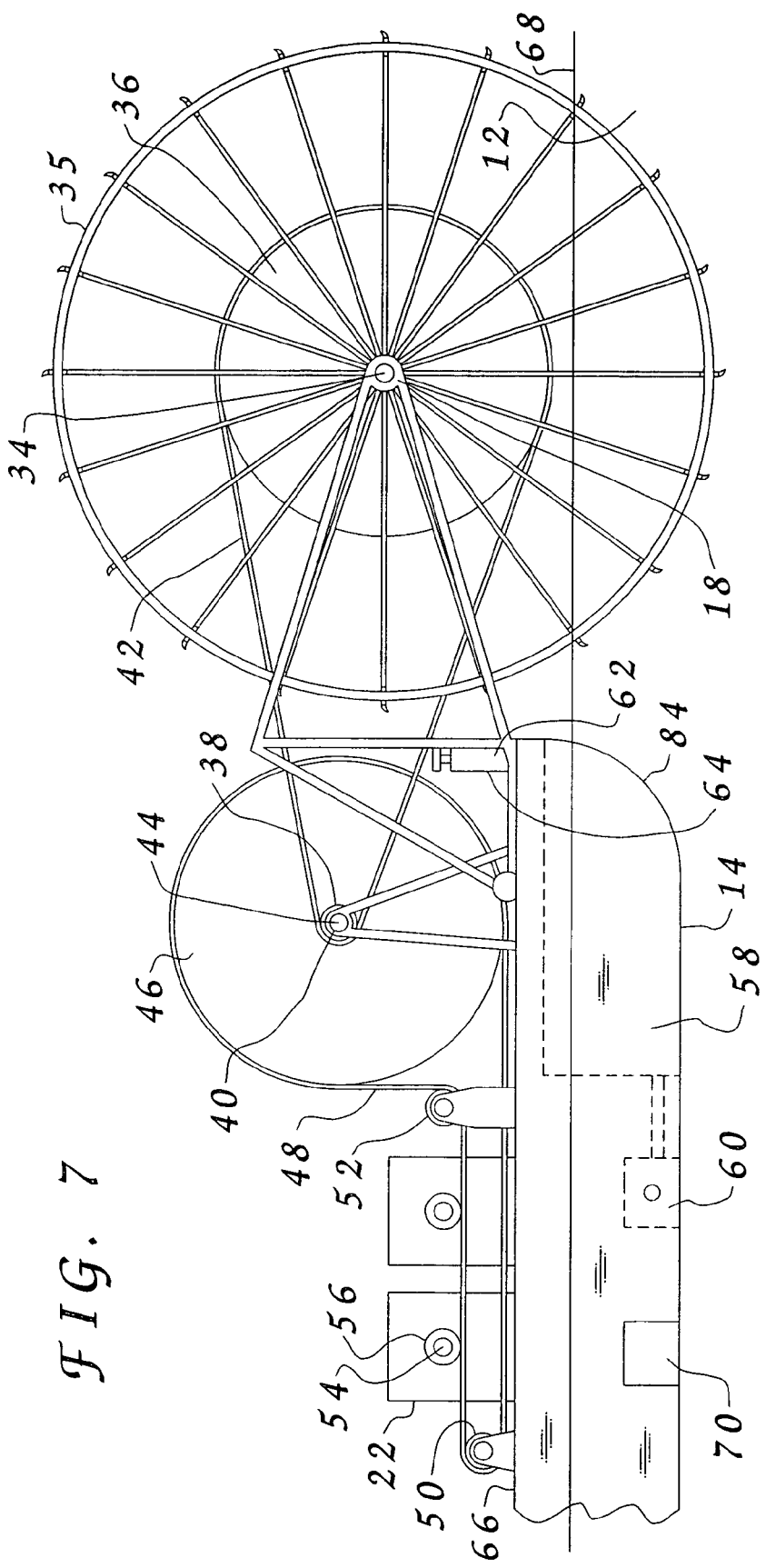
FIG. 7 is an elevational side view the portion of the electricity production unit depicted in FIG. 6.

For various reasons it may be desirable to selectively increase or decrease a depth of penetration of leading end paddle wheel 35 relative to flowing body of water 12. FIG. 7 depicts a fluid storage container 58 and a pumping assembly 60 positioned on floating platform 14. When it is desired to cause leading end paddle wheel 35 to move deeper into flowing body of water 12 pumping assembly 60 causes water to be transferred from flowing body of water 12 into fluid storage container 58 which changes a buoyancy of floating platform 14 thereby causing floating platform 14 to ride lower in flowing body of water 12. When it is desired to cause leading end paddle wheel 35 to move out of flowing body of water 12 pumping assembly 60 causes water to be transferred from fluid storage container 58 to be discharged into flowing body of water 12 which changes the buoyancy of floating platform 14 thereby causing floating platform 14 to ride higher in flowing body of water 12. FIG. 7 also depicts mechanical means to vary an elevational height of leading end paddle wheel 35. A hydraulic lift assembly 62, having opposing cylinders 64, see FIG. 6, is mounted to displace axle blocks 18 relative to floating platform 14 thereby selectively raising or lowering leading end paddle wheel 35 relative to a deck 66 of floating platform 14 and therefore relative to a surface 68 of flowing body of water 12.

FIG. 7 depicts control means to measure a torque of rotation of leading end paddle wheel 35 in the form of a control assembly 70. Control assembly 70 is capable of manipulating pumping assembly 60 and/or hydraulic lift assembly 62 to vary the depth of penetration of leading end paddle wheel 35 depending upon the measured torque of rotation of leading end paddle wheel 35. Controlling measurements other than the measurement of torque of rotation may be utilized if desired.

FIG. 8 depicts means to intensify a flow of water relative to leading end paddle wheel 35 in the form of an inclined surface 72 positioned beneath surface 68 of flowing body of water 12. Inclined surface 72 directs the flow of water to more aggressively engage paddle wheels 16 including leading end paddle wheel 35.

FIG. 1 depicts floating platform 14 as formed by a first barge 74 and a second barge 76 with a passageway 78 therebetween. Coupling means, in the form of walkways 80 and 82, secure first barge 74 and second barge 76 together across passageway 78. Floating platform 14 has four (4) sides generally defined by a leading end 84, a first side 86, a second side 88 and a trailing end 90. Each deployed paddle wheel 16 will be positioned within flowing body of water 12 adjacent to one of the sides 84, 86, 88 or 90 or within passageway 78. Leading end 84 faces generally into a direction of flow of flowing body of water 12. Trailing end 90 is in spaced relationship to, and generally parallel to, leading end 84 of floating platform 14. First side 86 extends rearward from leading end 84. Second side 88 extends rearward from leading end 84 in spaced relationship to, and generally parallel to, first side 86. Passageway 78 extends from leading end 84 between first side 86 and second side 88 to trailing end 90. Leading end paddle wheel 35 is partially positionable into the flowing body of water at leading end 84 of floating platform 14.

A first side paddle wheel 92 is partially positionable into flowing body of water 12 adjacent first side 86 of floating platform 14. A second side paddle wheel 94 is partially positionable into flowing body of water 12 adjacent second side 88 of floating platform 14. Suitable outer securing means, in the form of a mounting bracket 96, provides for suitable mechanical integrity of first side paddle wheel 92 and second side paddle wheel 94 relative to floating platform 14. A passageway paddle wheel 98 is partially positionable into flowing body of water 12 within passageway 78 of floating platform 14. A trailing end paddle wheel 100 is partially positionable into flowing body of water 12 at trailing end 90 of floating platform 14. As depicted in FIG. 1, preferably multiple paddle wheels 16 are positioned along each of the sides, 84, 86, 88 and 90, of floating platform 14 and within passageway 78.

FIG. 5 depicts a side view of one of the paddles 28. Paddle 28 has a periphery side 104 distal from central axis 34, not shown in this view, of paddle wheel 16. Periphery side 104 has a curvature 106 therealong. Curvature 106 provides for a truer delivery of energy from flowing body of water 12 to cause efficient rotation of paddle wheel 16.

With respect to the above description then, it is to be realized that the optimum dimensional relationships for the parts of the invention, to include variations in size, material, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An electricity production unit to provide for a conversion of energy from a flowing body of water into electricity, the electricity production unit comprising:
   a) a paddle wheel partially positionable into the flowing body of water, the paddle wheel having:
      i) a plurality of paddles which repetitively encounter the flowing body of water and move along with the flowing body of water while in contact with the flowing body of water;
      ii) opposing ends;
      iii) a central axis about which the paddle wheel rotates;
   b) mounting means to provide for mounting the opposing ends of the paddle wheel for rotation of the paddle wheel about the central axis of the paddle wheel;
   c) transfer means to provide for transferring motion from the rotation of the paddle wheel;
   d) an electricity generator capable of a conversion of the motion of the rotation of the paddle wheel transferred by the transfer means into electricity;
   e) means to selectively vary a depth of penetration of the paddle wheel into the flowing body of water; and
   f) control means to provide for measuring a torque of rotation of the paddle wheel and selectively varying the depth of penetration of the paddle wheel into the flowing body of water depending upon the measured torque of rotation of the paddle wheel.

2. The electricity production unit defined in claim 1, further comprising:
   a) a floating platform upon which the paddle wheel and the electricity generator are mounted;
   b) positioning means to provide for positioning the floating platform at a desired location within the flowing body of water.

3. The electricity production unit defined in claim 1, further comprising a floating platform upon which the paddle wheel and the electricity generator are mounted and wherein the means to selectively vary the depth of penetration of the paddle wheel into the flowing body of water further comprises a fluid storage container positioned on the floating platform wherein a transfer of fluid into the fluid storage container causes the floating platform to ride lower in the body of water and wherein a transfer of fluid out of the fluid storage container causes the floating platform to ride higher in the body of water.

4. The electricity production unit defined in claim 1, further comprising a floating platform upon which the paddle wheel and the electricity generator are mounted and wherein the means to selectively vary the depth of penetration of the paddle wheel into the flowing body of water further comprises mechanical means to vary an elevational height of the paddle wheel relative to a surface of the flowing body of water.

5. The electricity production unit defined in claim 1, further comprising means to intensify a flow of the water relative to the paddle wheel.

6. The electricity production unit defined in claim 5, wherein the means to intensify the flow of the water further comprises an inclined surface positioned beneath a surface of the flowing body of water.

7. The electricity production unit defined in claim 1, wherein the paddles further comprise a periphery side distal from the central axis of the paddle wheel and wherein the periphery side has a curvature therealong.

8. The electricity production unit defined in claim 1, wherein the transfer means further comprises a mechanical coupling between the paddle wheel and the electricity generator and wherein the mechanical coupling further comprises first rotational conversion means to provide for each rotation of the paddle wheel to produce a multiplicity of rotations of a generator axle of the electricity generator.

9. The electricity production unit defined in claim 1, wherein the transfer means further comprises a mechanical coupling between the paddle wheel and the electricity generator and wherein the mechanical coupling further comprises first rotational conversion means and second rotational conversion means wherein the first rotational conversion means and the second rotational conversion means cooperate to provide for each rotation of the paddle wheel to produce a multiplicity of rotations of a generator axle of the electricity generator.

10. A floating electricity production unit to provide for a conversion of energy from a flowing body of water into electricity, the floating electricity production unit comprising:
   a) a floating platform positionable on the flowing body of water, the floating platform having:
      i) a leading end to face into a direction of flow of the flowing body of water;

ii) a first side extending rearward from the leading end;
iii) a second side extending rearward from the leading end and in spaced relationship to and generally parallel to the first side;
iv) a passageway extending from the leading end between the first side and the second side;
b) a leading end paddle wheel partially positionable into the flowing body of water at the leading end of the floating platform, the leading end paddle wheel having:
i) a central axis about which the leading end paddle wheel rotates;
ii) opposing ends;
iii) a plurality of paddles;
iv) mounting means to provide for a mounting of the opposing ends of the leading end paddle wheel for rotation of the leading end paddle wheel about the central axis of the leading end paddle wheel;
c) a first side paddle wheel partially positionable into the flowing body of water adjacent the first side of the floating platform, the first side paddle wheel having:
i) a central axis about which the first side paddle wheel rotates:
ii) opposing ends;
iii) a plurality of paddles;
iv) mounting means to provide for a mounting of the opposing ends of the first side paddle wheel for rotation of the first side paddle wheel about the central axis of the first side paddle wheel;
d) a second side paddle wheel partially positionable into the flowing body of water adjacent the second side of the floating platform, the second side paddle wheel having:
i) a central axis about which the second side paddle wheel rotates;
ii) opposing ends;
iii) a plurality of paddles;
iv) mounting means to provide for a mounting of the opposing ends of the second side paddle wheel for rotation of the second side paddle wheel about the central axis of the second side paddle wheel;
e) a passageway paddle wheel partially positionable into the flowing body of water within the passageway of the floating platform, the passageway paddle wheel having:
i) a central axis about which the passageway paddle wheel rotates;
ii) opposing ends;
iii) a plurality of paddles;
iv) mounting means to provide for a mounting of the opposing ends of the passageway paddle wheel for rotation of the passageway paddle wheel about the central axis of the passageway paddle wheel;
f) transfer means to provide for transferring motion from the rotation of the various paddle wheels; and
g) at least one electricity generator capable of a conversion of the motion of the rotation of the various paddle wheels into electricity.

11. The floating electricity production unit defined in claim 10, wherein each of the various paddle wheels drives multiple electricity generators.

12. The floating electricity production unit defined in claim 10, wherein the floating platform further comprises a trailing end in spaced relationship to and generally parallel to the leading end of the floating platform and wherein the floating electricity production unit further comprises a trailing end paddle wheel partially positionable into the flowing body of water at the trailing end of the floating platform, the trailing end paddle wheel having:
a) a central axis about which the trailing end paddle wheel rotates;
b) opposing ends;
c) a plurality of paddles;
d) mounting means to provide for a mounting of the opposing ends of the trailing end paddle wheel for rotation of the trailing end paddle wheel about the central axis of the trailing end paddle wheel.

13. The floating electricity production unit defined in claim 10 wherein the floating platform further comprises a first barge, a second barge and coupling means and wherein the first barge extends from the first side to the passageway and wherein the second barge extends from the second side to the passageway and wherein the coupling means secure the first barge and the second barge together across the passageway.

14. A floating electricity production unit to provide for a conversion of energy from a flowing body of water into electricity, the floating electricity production unit comprising:
a) a floating platform positionable on the flowing body of water;
b) a plurality of paddle wheels, each paddle wheel partially positionable into the flowing body of water, each paddle wheel having:
i) a central axis about which the respective paddle wheel rotates;
ii) opposing ends;
iii) a plurality of paddles;
iv) mounting means to provide for a mounting of the opposing ends of the respective paddle wheel for rotation of the respective paddle wheel about the central axis of the respective paddle wheel;
c) transfer means to provide for transferring motion from the rotation of the plurality of paddle wheels;
d) an electricity generator capable, of a conversion of the motion of the rotation of the plurality of paddle wheels into electricity;
e) means to selectively vary a depth of penetration of the paddle wheels into the flowing body of water; and
f) control means to provide for measuring a torque of rotation of the paddle wheels and selectively varying the depth of penetration of the paddle wheels into the flowing body of water depending upon the measured torque of rotation of the paddle wheels.

15. The floating electricity production unit defined in claim 14, further comprising a plurality of electricity generators and wherein each paddle wheel drives a plurality of the electricity generators.

16. The floating electricity production unit defined in claim 14, further comprising rotational speed conversion means and wherein the electricity generator further comprises a generator axle and wherein the rotational speed conversion means provides for a conversion of each rotation of a respective paddle wheel into a multiplicity of rotations of the generator axle of the electricity generator.

17. The floating electricity production unit defined in claim 14, wherein the floating platform has four sides and wherein one of the paddle wheels is positioned within the flowing body of water adjacent one of the sides of the floating platform.

18. A floating electricity production unit to provide for a conversion of energy from a flowing body of water into electricity, the floating electricity production unit comprising:
a) a floating platform positionable on the flowing body of water, the floating platform having:

i) a leading end to face into a direction of flow of the flowing body of water;
ii) a first side extending rearwardly from the leading end;
iii) a second side extending rearwardly from the leading end and in spaced relationship to and generally parallel to the first side;
iv) a passageway extending from the leading end between the first side and the second side;
b) a leading end paddle wheel partially positionable into the flowing body of water at the leading end of the floating platform;
c) a first side paddle wheel partially positionable into the flowing body of water adjacent the first side of the floating platform;
d) a second side paddle wheel partially positionable into the flowing body of water adjacent the second side of the floating platform;
e) a passageway paddle wheel partially positionable into the flowing body of water within the passageway of the floating platform;
f) transfer means to provide for transferring motion from the rotation of the various paddle wheels; and
g) at least one electricity generator capable of a conversion of the motion of the rotation of the various paddle wheels into electricity.

19. A floating electricity production unit as in claim 18, the leading end paddle wheel having:
i) a central axis about which the leading end paddle wheel rotates;
ii) opposing ends;
iii) a plurality of paddles; and
iv) mounting means to provide for a mounting of the opposing ends of the leading end paddle wheel for rotation of the leading end paddle wheel about the central axis of the leading end paddle wheel.

20. A floating electricity production unit as in claim 19, the first side paddle wheel having:
i) a central axis about which the first side paddle wheel rotates:
ii) opposing ends;
iii) a plurality of paddles; and
iv) mounting means to provide for a mounting of the opposing ends of the first side paddle wheel for rotation of the first side paddle wheel about the central axis of the first side paddle wheel.

21. A floating electricity production unit as in claim 20, the second side paddle wheel having:
i) a central axis about which the second side paddle wheel rotates;
ii) opposing ends;
iii) a plurality of paddles; and
iv) mounting means to provide for a mounting of the opposing ends of the second side paddle wheel for rotation of the second side paddle wheel about the central axis of the second side paddle wheel.

* * * * *